United States Patent
Fan et al.

(10) Patent No.: US 7,590,282 B2
(45) Date of Patent: Sep. 15, 2009

(54) OPTIMAL TEST PATCH LEVEL SELECTION FOR SYSTEMS THAT ARE MODELED USING LOW RANK EIGEN FUNCTIONS, WITH APPLICATIONS TO FEEDBACK CONTROLS

(75) Inventors: Zhigang Fan, Webster, NY (US); Lalit Keshav Mestha, Fairport, NY (US); Yao Rong Wang, Webster, NY (US); Robert P. Loce, Webster, NY (US); Yeqing Zhang, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 771 days.

(21) Appl. No.: 11/314,670

(22) Filed: Dec. 21, 2005

(65) Prior Publication Data

US 2007/0140552 A1    Jun. 21, 2007

(51) Int. Cl.
*G06K 9/00* (2006.01)

(52) U.S. Cl. ....................................... 382/162

(58) Field of Classification Search ................. 382/162; 358/1.9, 530
See application file for complete search history.

(56) References Cited

U.S. PATENT DOCUMENTS

| | | | |
|---|---|---|---|
| 5,749,020 A | 5/1998 | Mestha et al. | |
| 6,694,109 B1 * | 2/2004 | Donaldson et al. | 399/49 |
| 6,741,816 B2 * | 5/2004 | Shim et al. | 399/49 |

* cited by examiner

*Primary Examiner*—Phuoc Tran
(74) *Attorney, Agent, or Firm*—Fay Sharpe LLP

(57) ABSTRACT

A method and system for selecting an optimal set of S number of calibration patches for an image producing system. The method of selecting the S number of calibration patches includes acquiring a set of K number of basis eigen vectors and model parameters which represent the image producing system having G number of colors and computing the optimal set of S number of colors selected from the set of G number of colors. Each one of the computed set of S number of colors is used for one of the S number of calibration patches.

25 Claims, 7 Drawing Sheets

OPTIMAL TEST PATCH LEVEL SELECTION FOR SYSTEMS THAT ARE MODELED USING LOW RANK EIGEN FUNCTIONS, WITH APPLICATIONS TO FEEDBACK CONTROLS

BACKGROUND

The present application relates to improved methods and systems for calibrating image rendering systems and compensating digital images within a system thereafter. It finds particular application in conjunction with document processing and image processing systems, and will be described with particular reference thereto. However, it is to be appreciated that some embodiments are amenable to other applications.

Maintaining consistent and uniform tones is a desired goal in most, if not all, image rendering processes and devices. That is, it is desirable for an image to appear the same no matter which rendering system renders the image, and no matter how many times an image is rendered on a particular rendering system. A rendered image should exhibit, e.g., the same lightness or hue each time it is rendered on a given image rendering system, and no matter on which image rendering system it is rendered. For this reason, rendering engines, such as print engines in a printing system, are put through a characterization process in order to determine appropriate compensation values for the particular engine. While this characterization process is useful in determining an initial set of compensation levels for a particular engine, it is often desirable to perform later calibrations to account for variations in the required compensation overtime. For example, in printing systems, it is commonplace to use tone reproduction curves (TRCs) which are determined during the initial characterization process. These TRCs can then be updated, calibrated or recalibrated over time by periodically printing test patches at various calibration levels and sensing the printed test patches to determine appropriate compensations for the initial TRCs so that the new TRCs give appropriate compensation for the current state of a drifted print engine.

Further to the above, where image data is available in a contone format, TRCs can be used to adjust pixel values to compensate for the characteristics of a particular rendering engine. During the calibration process, a calibration image is rendered by the rendering engine, and a sensor is used to measure or analyze an aspect of the rendered image. For example, the image includes portions that are meant to be rendered to have the same lightness or shade of gray. Therefore, the lightness or shade of gray of the rendered image is measured. The measurements may then be used to generate an engine response curve (ERC). The engine response curve may describe a response, such as an average response, over the entire area of the diagnostic or calibration image.

Engine response curves and tone reproduction curves are referred to as curves because the information they contain or are associated with may sometimes be displayed or discussed as a plot of data points. However, information related to both ERCs and compensating TRCs may be stored or manipulated as tables of data, sets of coefficients and/or constants associated with equations, or by other means, as may be convenient.

As indicated above, compensating TRCs are useful for compensating pixel-described input to produce desired colors or shades of gray with a relatively fine resolution. For example, compensating TRCs are useful where image pixels describe an input or desired color with one or more values in a relatively broad range of, for example, 0-255. Such pixels are said to describe an input or desired color or desired shade of gray with contone values. In such systems, one may select an appropriate compensating TRC for a pixel location in rendered image space based on a contone value of the input pixel and look-up and/or calculate a compensated contone value based on the selected compensating TRC.

A problem encountered, however, is the ability to define a minimal sampling procedure for creating and updating compensation TRCs. In particular, the problem can be stated as a need to determine the optimal, minimal set of gray levels or colors that should be used as calibration patches during the calibration process. Reducing the number of samples reduces cost and enables more frequent sampling over the life of the rendering system. To date, sampling during the calibration process or during an updating process has been applied in an ad hoc and inefficient manner. Therefore, there exists a need for an optimal or near optimal test patch level selection process for image rendering systems.

BRIEF DESCRIPTION

A method is provided for selecting a minimal set of calibration patches for an image producing system. The method includes determining a minimal number of calibration patches S which meets a quality specification of the image producing system, and performing minimum mean-square error optimization between an estimated printer performance and a measured printer performance for different combinations of the S number of colors.

Another method is provided for selecting an optimal set of calibration patches for an image producing system. This method of selecting an optimal set of S number of calibration patches includes acquiring a set of K number of basis eigen vectors and model parameters which represent the image producing system having G number of colors and computing the optimal set of S number of colors selected from the set of G number of colors. Each one of the computed set of S number of colors is used for one of the S number of calibration patches.

An image producing system capable of producing G number of colors is also provided. The image producing system includes a print engine for producing printed images, printed characterization levels, and printed calibration patches. A sensing system is included for measuring reflectance of the printed characterization levels and printed calibration patches, and a characterization analysis system is configured to compute a set of optimal calibration levels; and a calibration analysis system is configured to compute a set of compensation TRCs based on sensing measures of reflectance of the printed calibration patches.

DETAILED DESCRIPTION

Figure 1:
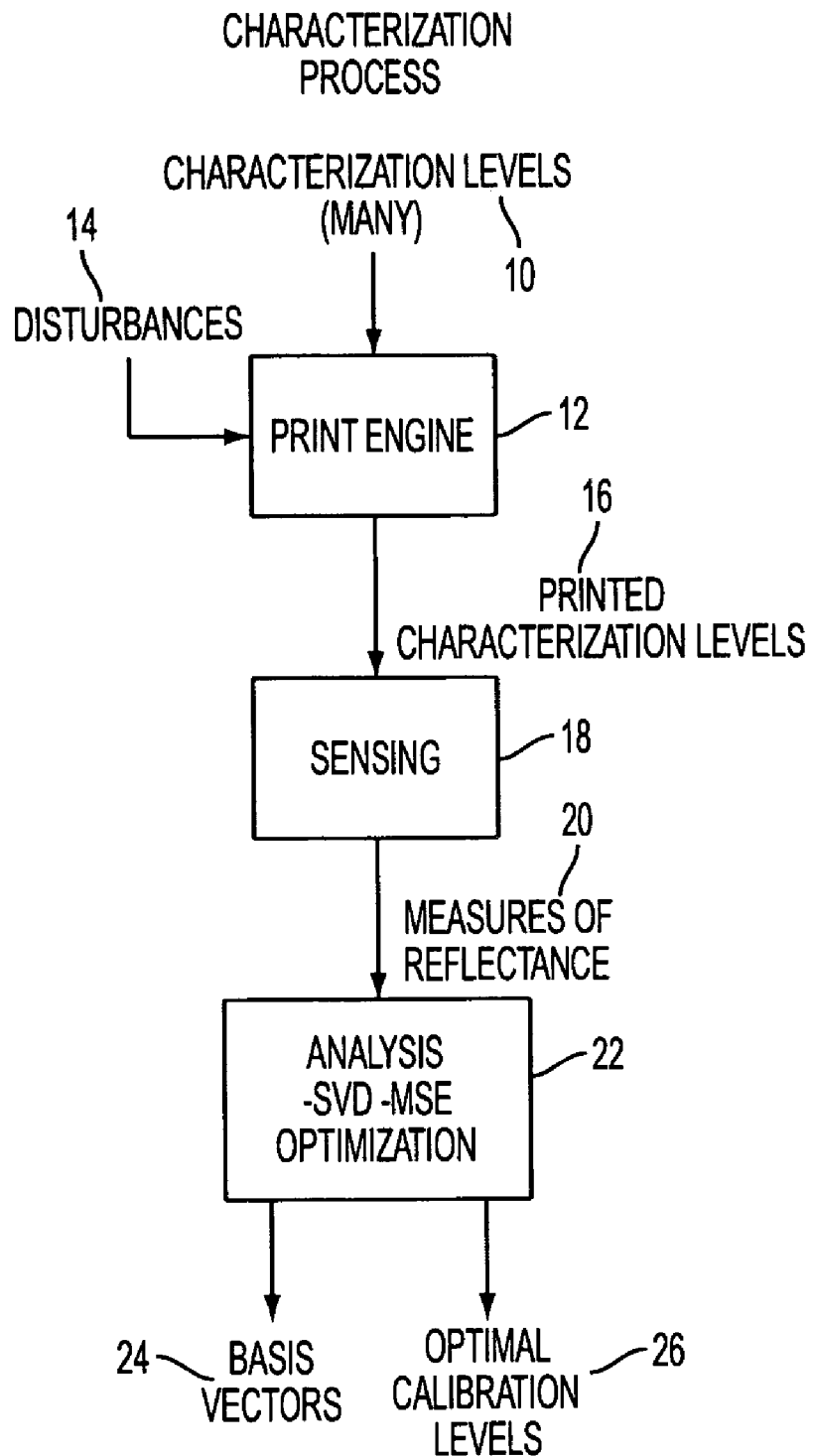
FIG. 1 is an exemplary characterization process suitable for incorporation of concepts of the present application.

Various aspects of print engine response can be modeled by making use of basis vector representations of the respective aspects of the print engine. Using basis vector methodology significantly aides in efficiently representing and controlling print engine response while rejecting uncorrelated noise. For example, in U.S. Pat. No. 5,749,020 issued to Mestha et al., the disclosure of which is incorporated herein by reference in its entirety, a measured TRC is decomposed into orthogonal basis functions. In other words, a linear combination of basis functions is used to model the imaging system with respect to actuators for producing a predicted TRC.

One consideration within the above-mentioned application, and for calibration in general, is the selection of gray levels and colors for measuring. Conventional interpolation-based calibration methods do not utilize optimal sample levels. Defining a minimal set of samples becomes increasingly important when one considers the multitude of variables to be comprehended under calibration and control methodologies, e.g., colors, halftones, media, printers, etc., and the amount of unnecessary measurement time spent by the printer and the sensing system, which can be otherwise utilized for making useful prints to the customer. In contrast to prior methods, the present application develops a low rank approximation method to provide a theoretically optimal algorithm to select levels required for measurement so that the final outcome ensures measurement accuracy and efficiency with a minimal variable set. Minimizing the number of samples reduces the computation, time, toner/ink usage, and memory requirements of the system, as well as the spatial extent of the test patches. This results in a minimization of cost and enablement of more frequent/efficient sampling and, therefore, enables more applications to use the methodology resulting into more useful prints, particularly when the method is incorporated in correcting for time dependent print quality errors in production color printers. In embodiments described herein, a mean-square error minimization algorithm is utilized to provide the minimal set.

Another consideration with respect to applications of interest concerns the feedback control methodology that incorporates the minimal set of gray values. A linear combination of basis functions may be used to model the imaging system with respect to actuators for producing a predicted TRC. Both the basis vectors and the basis vector weights may be updated. However, as constructing basis vectors at each sample interval can require a great deal of gray level sampling the present application partly derives its benefit by deriving basis vectors that fully describe relevant aspects of the printer and then only updating weights for the vectors during calibration or real-time feedback control process. If the basis vectors fully describe the characteristics of the printer then updating weights is sufficient during the calibration process to provide compensation for the drifted print engine. An aspect of the application then is understood to be formulation of an algorithm that defines a minimal sampling procedure for creating and updating the basis vector weights. In particular, the problem can be stated as a need to determine the optimal minimal set of gray levels or colors that should be used as calibration patches within a control loop. Note basis vectors that have been shown to be beneficial when used in this manner in a feedback control method include Singular Value Decomposition (SVD) eigen vectors, Principal Component Analysis (PGA) eigen vectors, Discrete Cosine Transform (DCT) vectors, Fourier vectors, and Wavelets as well as other eigen vectors.

Embodiments of the present application described herein comprise several aspects of defining and using optimal gray levels or color levels in test patches for calibration and control of a printing system. One aspect is the methodology of sampling during a characterization mode and sampling in an update (calibration) mode. Sampling in the characterization mode is performed with a relatively large number of gray levels over a range of print engine performance, e.g., environmental conditions, media, etc. The fineness of the gray level or color level sampling in such local variation is taken into consideration. For example, the initial sampling may preferably be over the full 256 levels for a system that can potentially possess local gray level shifts in its tone response curve. More likely, however, fewer levels, e.g., 32, may well characterize gray level performance. From this finely and broadly sampled state, basis vectors are derived along with an initial set of weights using a formalism such as Singular Value Decomposition on differences from a mean performance. The number of basis factors, S, is determined when a reduced set of basis vectors corresponding to the largest S singular values satisfies the quality requirement of the image producing system. The reduction of basis vectors improves efficiency of computation, storage, and patch usage.

Reducing the number of basis vectors also beneficially reduces the total amount of noise incorporated into the modeling. For example, a particular printer engine will have an inherent amount of noise and even when printing patches having identical gray levels, because of noise in the printer engine, the printed patches will have a slight variation. Reducing the number of basis vectors thereby reduces the adverse effects of this noise. Copending patent application Ser. No. 10/922,316 by Yeqing Zhang et al., and copending patent application Ser. No. 10/923,116 also by Yeqing Zhang et al., each of which is incorporated herein by reference in its entirety, describe this process with respect to spatial TRCs.

As mentioned above, sampling in the characterization mode is normally performed with a large number of gray levels in order to cover the full range of the system. However, in an update or calibration mode, a smaller number of gray levels or colors may be created and sampled in order to update the weights of the basis vectors. The optimal level selection described hereinafter allows for a very efficient use of calibration target space. One benefit of this efficient use of calibration target space is that calibration patches can be written in small unobtrusive areas, such as an Inter Document Zone (IDZ). The present application hereinafter describes a method of selecting gray levels in a manner that defines an essentially minimal optimal set.

The teachings herein apply to images of various forms, such as gray-scale images and color images. Due to the general applicability to image class, within the description below the terms "gray levels" and colors are used synonymously. Also, the teachings herein apply to various color transformation methods such as tone reproduction mapping, color lookup tables, and color transformation matrices. These transformations are collectively referred to as tone reproduction curves, or simply TRCs.

With reference to FIG. 1, a characterization process suitable for incorporation of concepts of the present application is shown. In the characterization process, a broad range of characterization levels 10 are input into a print engine 12. Invariably, however, various disturbances 14 such as, e.g., print engine noise are processed within the print engine 12 and are depicted as an input in the figure. The print engine 12 generates printed characterization levels 16 based on the input characterization levels which are then measured by a sensing device 18 such as, e.g., an RGB scanner, a spectral sensor with a photo detector or other such sensing device as known in the art. The sensing device 18 produces quantitative measures of reflectance 20 of the printed characterization levels which are then input to an analysis process 22. It is to be understood, however, that the phrase "measures of reflectance" is intended to include various measured aspects of the printed characterization levels as used in the art. The present embodiment, however, is being described in terms of a gray-scale image for purposes of explanation of the present application. The analysis process 22, which is explained in more detail below, produces a minimal set of basis vectors 24 and an optimal set of calibration levels 26.

Figure 2:
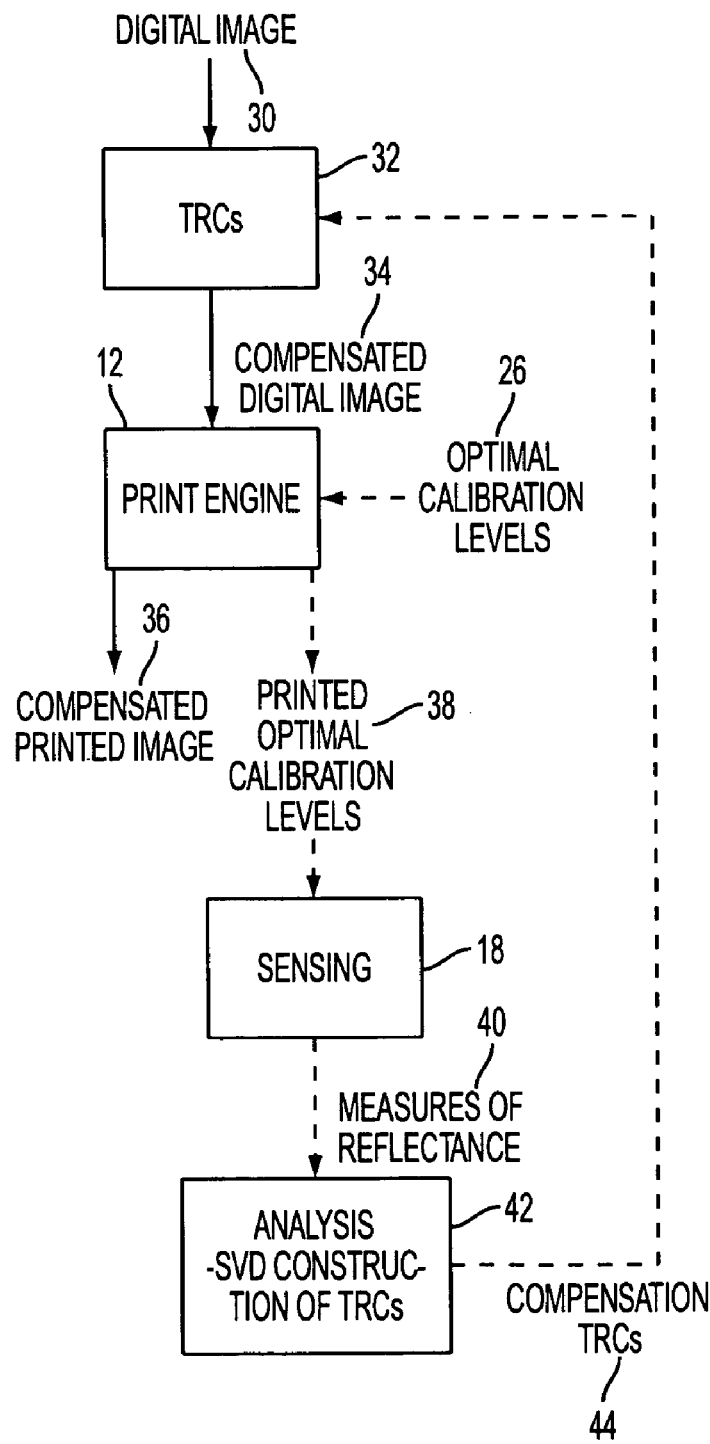
FIG. 2 is an exemplary calibration process suitable for incorporation of concepts of the present application.

With reference now to FIG. 2, a calibration process suitable for incorporating concepts of the present application is shown. It is to be understood that the calibration process can be used either during normal printing operations of the print engine 12 or during an update of the calibration levels of the print engine. As shown in the figure, it can be assumed that the calibration process is occurring during normal printing operations. Typically, a digital image 30 is processed in conjunction with TRCs 32 to produce a compensated digital image 34. The print engine 12 processing the compensated digital image 34 in conjunction with the previously developed optimal calibration levels 26 then produces a compensated printed image 36. In addition to the compensated printed image 36, the print engine 12 periodically prints, either upon an external command or upon a periodic sequence, prints the optimal calibration levels 26 producing printed optimal calibration level patches 38. The printed calibration patches are then measured by sensing device 18 to produce a new calibration set of measures of reflectance 40. The calibration measures of reflectance are then input into an analysis process 42 for the purpose of producing a set of compensation TRCs 44. The compensation TRCs 44 then either replace or augment the calibration set of TRCs 32 for further digital image inputs 30.

Figure 3:
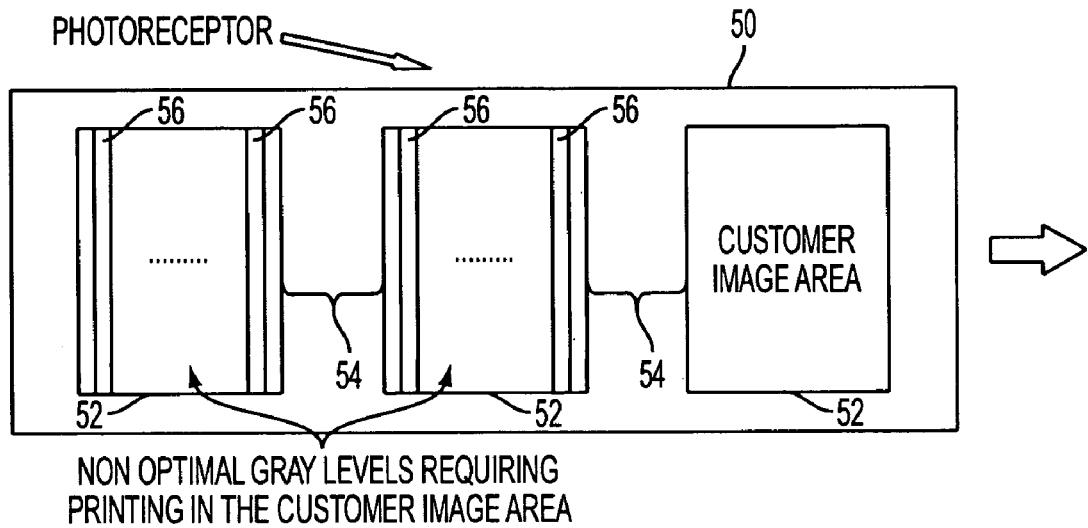
FIG. 3 is a representation of non-optimal gray-level patches on a photoreceptor belt.
Figure 4:
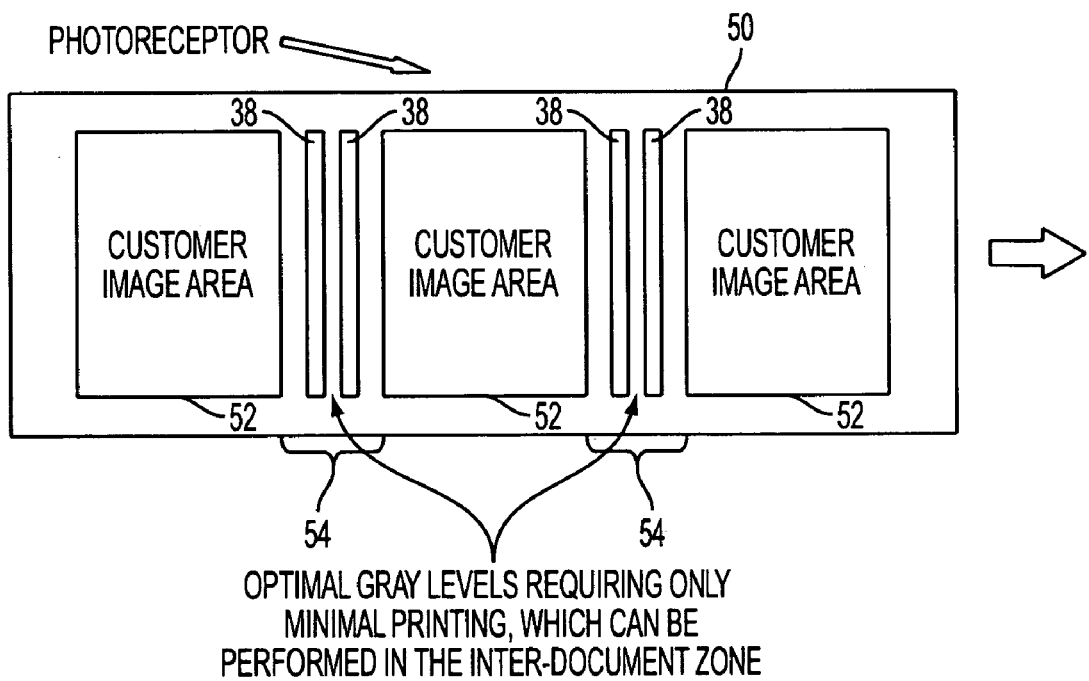
FIG. 4 is a representation of gray-level patches according to concepts of the present application on a photoreceptor belt.

To illustrate benefits of embodiments of the present application, a graphical representation of the benefits is provided with reference to FIGS. 3 and 4. The figures graphically illustrate a benefit, particularly with regard to efficiency and productivity for on-belt sensing. With reference to FIG. 3, a photoreceptor belt 50 is shown. In this particular example, customer image areas 52 are shown which represent areas of the photoreceptor belt upon which the compensated printed images 36 may be produced. The interdocument zone 54 is shown as the area between successive customer image areas. In prior art solutions, a relatively large number of calibration patches or strips are required to obtain sufficient calibration data. The non-optimal prior art calibration strips 56, because of their relatively large number, may overlap a customer image area 52, thereby lowering printer system productivity. However, with reference to FIG. 4, the smaller number of printed optimal calibration level strips 38 required according to methods of the present application enables printing of the calibration strips within the interdocument zone 54 without encroaching upon the customer image areas 52. Printer system productivity is thereby increased because of the additional number of customer image areas available for printing customer digital images 30. Processing is further made more efficient because of the reduced amount of processing necessary to process the reduced number of calibration patches.

The general goal of the optimization process is to select gray levels for calibration that are the best representation of the complete set of gray level produced by the printer. The optimization that has been found to be beneficial minimizes the mean-square difference between the gray levels predicted by the model and the actual gray levels produced by the printer.

The optimization criteria and process are now described in more detail. Matrix notation is used due to its compact representation of data and operations on that data, but it is known to those skilled in the art that this notation (matrices, columns, vectors) can be interpreted in alternative forms, such as, e.g., simultaneous linear equations. For simplicity and notation and ease of explanation, it is assumed that the images are gray, although the described process can be applied directly to color images. It is also assumed that output drift is modeled as the sum of K eigen vectors:

$$o = \Sigma_k a(k) v(k) + n, \quad (1)$$

where o is the above-mentioned output drift vector with G entries, G being the number of gray levels, v(k) is the k-th eigen vector (G×1), and a(k) is the k-th model parameter or weight, and n is the error vector with independent identical distribution. Equation 1 can also be written in matrix form as:

$$o = Va + n, \quad (2)$$

where V is a G×K matrix whose k-th column is v(k), and a is K×1, whose k-th entry is a(k). The parameter vector a can be estimated by the least square method as:

$$a^* = (H^T H)^{-1} H^T y, \quad (3)$$

where superscript T denotes matrix transpose, H is an S×K matrix, S is the number of sample patches used in estimation, and y is the data vector (S×1) which is obtained from experimental data during the calibration process. The rows of H are selected from V matrix rows. Specifically, if the i-th patch has a gray level of g(i), the i-th row of H is then a replica of the g(i)-th row of V.

If the mean square prediction error is defined as $$ErrPredict = E[(o^* - o)^T (o^* - o)], \quad (4)$$

where o* is the estimation of o and E[·] denotes expectation, the problem of patch selection can be formulated as a method to find the matrix H (or equivalently to find g(i) for i=1, 2, ..., S) that yields the least prediction error ErrPredict. In other words, the error ErrPredict is the mean-square difference between the actual printer output and the model predicted output.

There are three factors that contribute to a prediction error: the noise n, the low rank approximation if not all of the eigen vectors are used, and the estimation error of a. The first two of these factors are not related to the sample selection and, therefore, only the estimation error of a is considered.

The set of gray levels used for calibration that possess the maximum dispersion provides the minimum prediction error. More specifically, it can be shown that the optimization of prediction error is equivalent to minimizing the trace of a matrix expressed as tr[$(H^T H)^{-1}$]. For example:

If vector e (G×1) is defined as the error introduced by estimation inaccuracy, it can be evaluated as $$e = V \Delta a, \quad (5)$$

where $\Delta a = a^* - a$ is an K×1 estimation error vector.

Note that V is orthonormal and estimation a* is unbiased, and the expected error energy can be evaluated as $$E[e^T e] = E[\Delta a^T V^T V \Delta a] = E[\Delta a^T \Delta a] = \Sigma_k Var[a^*(k)]. \quad (6)$$

The covariance matrix of a*, as described in the above-mentioned U.S. Pat. No. 5,749,020, can be evaluated as $$\mathrm{Cov}(a^*) = c(H^T H)^{-1} \quad (7)$$

where c is a constant, yielding $$\Sigma_k \mathrm{Var}[a^*(k)] = tr[\mathrm{Cov}(a^*)] = tr\, c[(H^T H)^{-1}]. \quad (8)$$

To reduce computation, the potential candidates are first pruned. In matrix V, if two columns are proportional, specifically, if $V_{kj} = \alpha v_{ki}$ for k=1, 2, ..., K, and the proportional factor $\alpha$ is less than 1, column j will be eliminated from the selection process. This is due to the fact that if column j were selected, replacing it with column i will always reduce $tr[(H^T H)^{-1}]$. Therefore, column j can be removed from the matrix.

When S is small, a brute force search may find the sample gray levels that minimize $tr[(H^T H)^{-1}]$. The calculation is to compute $tr[(H^T H)^{-1}]R^S$ number of times (assuming two or more samples may share the same gray level), where R is the number of the rows in V that have survived pruning.

When S is larger, an iterative method such as Newton-Raphson, or a genetic method may be applied. One simple method is as follows:

a) Select an initial set of gray levels g(1), g(2), ..., g(S)
b) For each iteration, perform steps c)-d) below
c) For i=1 to S:
   Calculate the change of $tr[(H^T H)^{-1}]$ with the replacement of g(i) with g(i-1);
   Calculate the change of $tr[(H^T H)^{-1}]$ with the replacement of g(i) with g(i+1);
d) From the calculation in step c), find the one that minimizes $tr[(H^T H)^{-1}]$. The iteration ends when no replacement can make any improvement. Otherwise, update the H matrix based on another set of S gray levels and repeat step c) until there are no more remaining sets of S gray levels to select.

The calculation in step c) can be substantial, especially when K (model rank) is large, because inversion is computationally expensive for large matrices. However, advantage can be taken of the fact that, on each pass, only one vector in H is replaced, and the calculation can therefore be simplified. If U denotes the updated matrix of $H^T H$ after g(i) is replaced by g(j), then $$U^{-1} = (H^T H - h(i)h(i)^T + h(j)h(j)^T)^{-1} \quad (9)$$

where h(i) is the i-th column of V. Using the Woodbury identity twice yields:

$$\begin{aligned} U^{-1} &= (H^T H - h(i)h(i)^T + h(j)h(j)^T)^{-1} \\ &= W^{-1} - [W^{-1} h(j)h(j)^T W^{-1}]/[1 + h(j)^T W^{-1} h(j)], \end{aligned} \quad (10)$$

where $$\begin{aligned} W^{-1} &= (H^T H - h(i)h(i)^T)^{-1} \\ &= \left[(H^T H)^{-1} h(i)h(i)^T (H^T H)^{-1}\right]/\left[1 - h(i)^T (H^T H)^{-1} h(i)\right], \end{aligned} \quad (11)$$

As $(H^T H)^{-1}$ is known from the results of the final step in the iteration, the above calculation essentially contains only two matrix-vector multiplications. No matrix inversion is performed.

In many typical calibration applications, the eigen vectors are smooth functions. The selection process may be conducted in a hierarchical manner to further reduce computation. Also, intuition can be used in selecting combinations of gray levels so that the number of combinatorial searches required can be minimized. Specifically, the optimization procedure first executes the above-described procedural steps a)-d) with a reduced resolution. The solution for the reduced resolution is used as the initial condition to run the same procedural steps a)-d) again for the full resolution calculation.

While the algorithm described above uses gray levels during the combinatorial search, the method can be easily extended to any variable set of interest.

Exemplary benefits of methods of the present application are presented are now described. A procedure is described for deriving and using the optimal gray levels based on spatial TRC data. The quality of TRCs derived from equispaced levels is compared with the quality derived from levels determined using an embodiment of the present application. A system is assumed with a small number of gray levels (32, rather than 256) to make the demonstration tractable with a reasonable amount of effort and a small number of calibration prints and measurements.

A first printing is performed using all of the 32 gray levels in a calibration target where a gray strip for each level spans across the page. Measurements are taken of the spatial non-uniformity for each gray level to obtain spatial TRC data. This first printing and measurement results are used for several purposes:

1. Deriving TRC basis vectors that generally characterize the system. A reduced set of 2 basis vectors is selected as the system characterization. Prior experience has shown that this number is adequate when significant drift in print engine response is not present.
2. Performing analysis according to the present application to derive the optimal gray levels for future calibration updates. Optimal gray levels are derived for three separate cases: 2 levels, 4, levels, and 8 levels.

A second printing of the 32 levels is performed and used for the following steps:

1. The complete print engine state (spatial TRCs) is measured for t>0. These measurements serve as a reference for comparison of TRCs derived from subsets of gray levels.
2. TRCs are generated using several equispaced subsets of gray levels, namely 2, 4, and 8 levels.
3. TRCs are generated using the optimal levels derived above.
4. The derived TRCs are compared to the fully measured TRCs.

The gray levels used in the procedure are provided in Table 1 below.

TABLE 1

| Number of Patches | Optimal Values | Equispaced Values |
|---|---|---|
| 2 | 137, 233 | 65, 193 |
| 4 | 137, 169, 225, 233 | 33, 97, 161, 225 |
| 8 | 113, 137, 153, 169, 201, 225, 233, 241 | 17, 49, 81, 113, 145, 177, 209, 241 |

Figure 5:
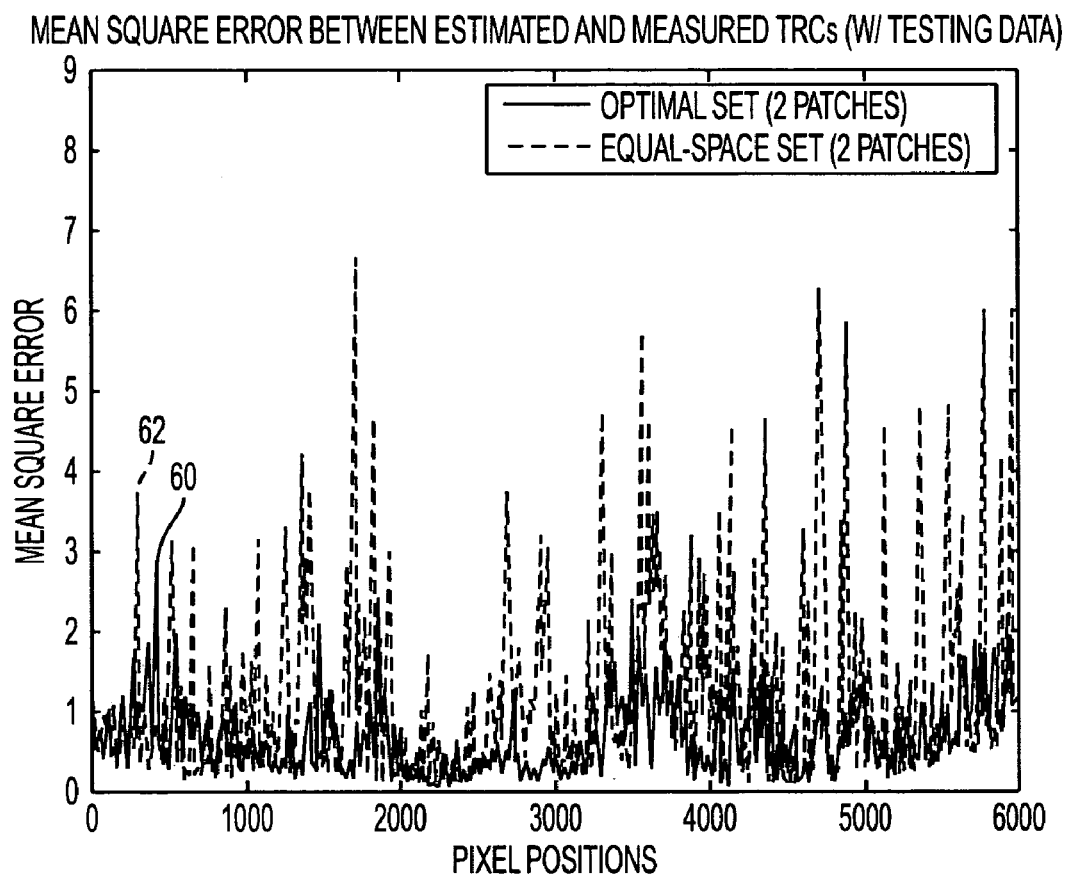
FIG. 5 is a plot of mean-square error for an optimal 2-level set of patches and an equispaced 2-level set of patches.
Figure 6:
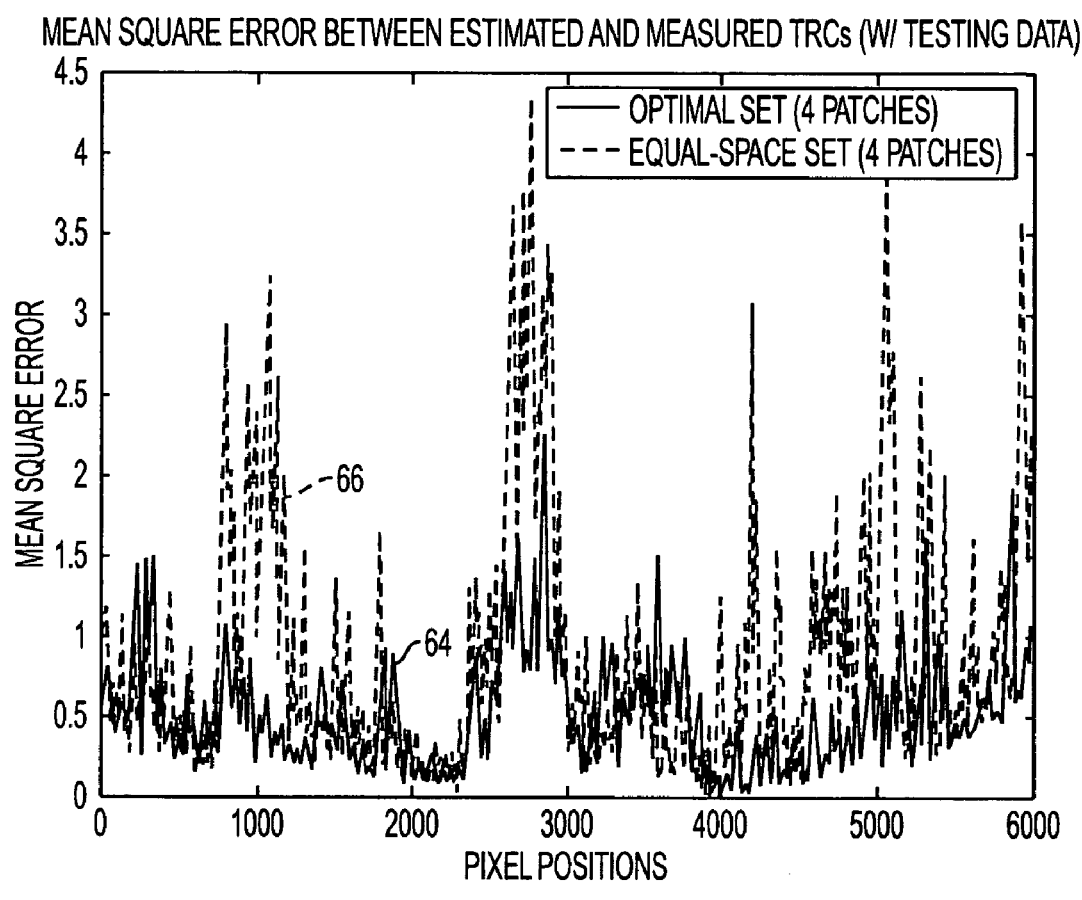
FIG. 6 is a plot of mean-square error for an optimal 4-level set of patches and an equispaced 4-level set of patches.
Figure 7:
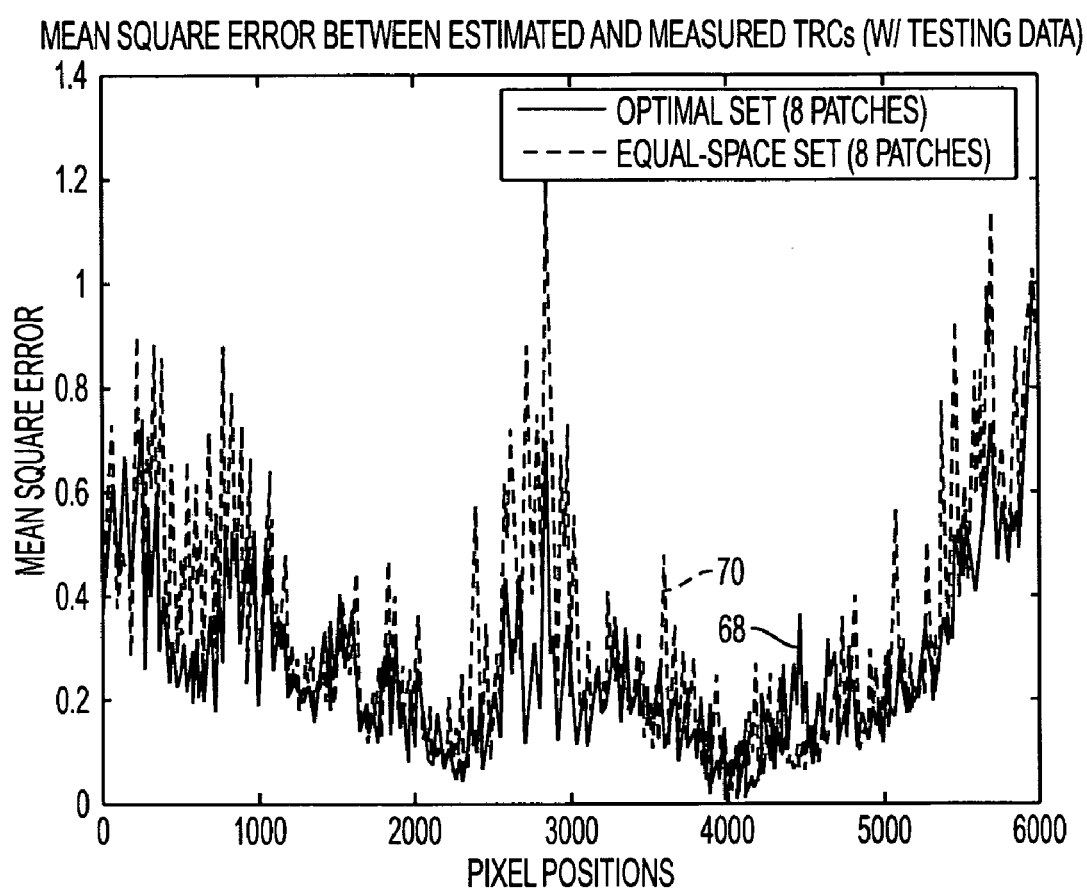
FIG. 7 is a plot of mean-square error for an optimal 8-level set of patches and an equispaced 8-level set of patches.

With reference to FIG. 5, the error incurred by using subsets of gray levels according to the two above-described methods, using 2 levels each, is shown. The error is calculated by first deriving all gray levels (32) from a given subset through the use of the basis vectors. The derived 32-level TRCs are then compared to the measured 32 levels. For each subset, the mean-square error (MSE) over the 32 levels is plotted. In FIG. 5, the MSE for the optimal 2-level set 60 and the MSE for the equispaced 2-level set 62 are plotted against the spatial dimension in units of pixels. With reference now to FIG. 6, the MSE for the optimal 4-level set 64 and the MSE for the equispaced 4-level set 66 are plotted against the spatial dimension. And finally, with reference now to FIG. 7, the MSE for the optimal 8-level set 68 and the MSE for the equispaced 8-level set 70 are similarly plotted.

Figure 8:
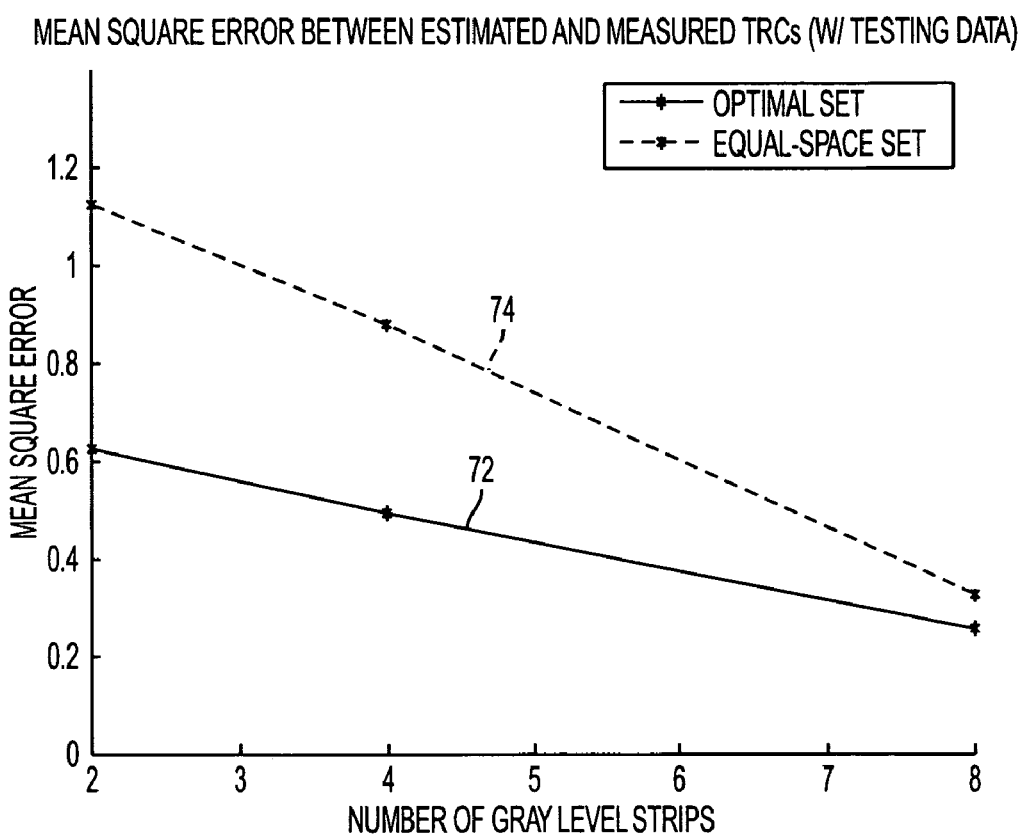
FIG. 8 is a plot of overall mean-square error for optimal sets of patches and equispaced sets of patches versus the number of levels.

With reference now to FIG. 8, the MSE for each of the 2-level, 4-level, and 8-level, subsets is calculated across the spatial dimension for all gray levels. The resulting data points are plotted and it can be observed that the optimal-set error 72 incurred by using the optimal gray levels is roughly half of the equispaced-set error 74 incurred by using the prior-art equispaced levels.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of selecting a set of S number of calibration patches obtained from an image for an image producing system possessing G number of colors, the method comprising:
determining S such that S is a minimal number which meets a quality specification of the image producing system; and
performing a minimum error optimization between an estimated printer performance and a measured printer performance for different combinations of S number of colors;
wherein the error optimization represents a minimal variable set for optimizing the calibration patches.

2. The method of claim 1, wherein
the performing the minimum error optimization comprises:
modeling the imaging producing system with a plurality of basis functions for producing a predicted TRC, each basis function including a basis vector and a basis vector weight;
modeling an output drift of the image producing system based on at least the plurality of basis vectors and the plurality of basis vector weights;
generating a plurality of combinations of S number of colors selected from the G number of colors;
computing a prediction error for each of the generated combinations of S number of colors, the prediction error comprising a difference between the estimated printer performance and the measured printer performance based on the modeling an output drift;
selecting a combination of S number of colors from the plurality of generated combinations of S number of colors which results in a minimal computed prediction error; and
producing S number of calibration patches when calibrating the system, the color of each of the calibration patches corresponding uniquely to one of the selected colors.

3. The method of claim 2, further comprising:
sensing the produced S number of calibration patches; and
computing a set of compensation TRCs for use by the image producing system when producing images.

4. The method of claim 1, wherein:
the performing the minimum error optimization comprises:
forming a set of K number of basis vectors grouped in a matrix V as a G by K matrix; and
forming a matrix H as an S by K subset of the matrix V by selecting S number of colors that minimizes $tr[(H^TH)^{-1}]$ for different combinations of the S colors; and
the determining S comprises determining S using at least one of Singular Value Decomposition eigen vectors, Principal Component Analysis eigen vectors, Discrete Cosine Transform vectors, Fourier vectors, and Wavelets.

5. The method of claim 4 wherein the basis vectors are eigen vectors of one of the types SVD, PCA, DCT, Fourier and Wavelets.

6. The method of claim 4, including the step of:
pruning the matrix V prior to forming the matrix H.

7. The method of claim 6, wherein the pruning includes the step of:
searching for pairs of proportional columns in the matrix V such that $V_{ki} = \alpha V_{kj}$ for k=1, 2, ..., K, and proportional factor $\alpha$ is less than 1, $V_{ki}$ denoting a first proportional column and $V_{kj}$ denoting a second proportional column; and
removing the first proportional column of each of the proportional pairs of columns.

8. The method of claim 4, wherein the forming includes the steps of:
computing $tr[(H^TH)^{-1}]$ for each possible combination of S rows of the pruned matrix V; and
selecting the combination having the minimum computed $tr[(H^TH)^{-1}]$.

9. The method of claim 4, wherein the forming includes the steps of:
selecting an initial set of S colors g(i), for i=1, 2, ..., S comprising the matrix H;
computing a current value of $tr[(H^TH)^{-1}]$;
computing new values of $tr[(H^TH)^{-1}]$ by performing for i=1, 2, ..., S the steps of:
computing a first new value of $tr[(H^TH)^{-1}]$ based on a first replacement of g(i) by g(i−1);
computing a second new value of $tr[(H^TH)^{-1}]$ based on a second replacement of g(i) by g(i+1);
terminating the computing new values if neither of the first new value or the second new value is less than the current value of $tr[(H^TH)^{-1}]$;
selecting a current replacement based on which of the first replacement and the second replacement computed a smaller new value of $tr[(H^TH)^{-1}]$; and
updating the current value of $tr[(H^TH)^{-1}]$ based on the selected replacement;
for each remaining unique set of S colors, selecting a new unique set of S colors comprising the matrix H; and
repeating the computing a current value and the computing new values for each selected new set of S colors.

10. The method of claim 9, wherein the computing a first new value and the computing a second new value, wherein j=i−1 or j=i+1 respectively, comprise the step of:
computing $U^{-1} = W^{-1} - [W^{-1}h(j)h(j)^TW^{-1}]/[1+h(j)^TW^{-1}h(j)]$, wherein $W^{-1} = [(H^TH)^{-1}h(i)h(i)^T(H^TH)^{-1}]/[1-h(i)^T(H^TH)^{-1}h(i)]$, and wherein h(i) is the i-th column of the matrix H, h(j) is the j-th column of the matrix H, U is $H^TH$ after replacing g(i) with g(j), and $(H^TH)^{-1}$ is taken from the stored results of a previous iteration of the computing new values.

11. The method of claim 4, including the step of:
producing S number of calibration patches when characterizing the system, the color of each of the calibration patches corresponding uniquely to one of the selected colors.

12. The method of claim 4, further including the step of: producing S number of calibration patches when calibrating the system, the color of each of the calibration patches corresponding uniquely to one of the selected colors.

13. The method of claim 12, further including the step of: sensing the produced S number of calibration patches; and computing a set of compensation TRCs for use by the system when producing images.

14. The method of claim 1, further including the step of: producing S number of calibration patches in an Inter Document Zone of the system when calibrating the system, the color of each of the calibration patches corresponding uniquely to one of the selected colors.

15. The method of claim 14, further including the step of: sensing the produced S number of calibration patches; and computing a set of compensation TRCs for use by the system when producing images.

16. A method of selecting an optimal set of S number of calibration patches obtained from an image for an image producing system comprising:
acquiring a set of K number of basis eigen vectors and model parameters which represent the image producing system having G number of colors;
computing the optimal set of S number of colors selected from the set of G number of colors; and
using each one of the computed set of S number of colors for updating one of the S number of calibration patches.

17. The method of claim 16, the acquiring including:
forming a set of G number of eigen vectors of the image producing system capable of producing G number of colors, wherein an output drift o of the system includes the G number of eigen vectors; and
forming a subset of S number of the G number of eigen vectors which minimizes a mean-square function of the subset.

18. The method of claim 16, the acquiring including:
representing the G number of colors by g(i), for 1=1, 2, . . ., G, wherein an output drift o of the system, having G number of entries, is modeled by $o=\Sigma_k a(k)v(k)+n$, wherein v(k) is the k-th eigen vector having G entries, a(k) is the k-th model parameter, and n is an error vector.
forming a matrix V as a G by K matrix comprising the eigen vectors of the image producing system; and
forming a matrix H as an S by K matrix comprising a subset of the matrix V by selecting S number of the colors which minimizes $tr[(H^T H)^{-1}]$ wherein S is a predetermined number of calibration patches, and each of the entries of the matrix H in the K dimension is selected from the matrix V in the G dimension based on each of the selected colors, the selected S number of colors comprising the colors of the calibration patches.

19. An image producing system capable of producing G number of colors comprising:
a print engine for producing printed images, printed characterization levels, and printed calibration patches;
a sensing system for measuring reflectance of the printed characterization levels and printed calibration patches;
a characterization analysis system configured to compute a set of optimal calibration levels; and
a calibration analysis system configured to compute a set of compensation TRCs based on sensing measures of reflectance of the printed calibration patches.

20. The image producing system of claim 19, wherein the computing a set of optimal calibration levels includes:
forming a set of G number of eigen vectors of the image producing system, wherein an output drift o of the system includes the C number of eigen vectors; and
forming a subset of S number of the G number of eigen vectors which minimizes a mean-square function of the subset, wherein S is a predetermined number of calibration patches.

21. The image producing system of claim 19, wherein the characterization analysis system is configured to:
acquire a set of K number of basis eigen vectors and model parameters which represent the image producing system having G number of colors g(i), for i=1, 2, . . ., G, wherein an output drift o of the system, having G number of entries, is modeled by $o=\Sigma_k a(k)v(k)+n$, wherein v(k) is the k-th eigen vector having G entries, a(k) is the k-th model parameter, and n is an error vector;
form a matrix V as a G by K matrix comprising the eigen vectors of the image producing system; and
form a matrix H as an S by K matrix comprising a subset of the matrix V by selecting S number of the colors which minimizes $tr[(H^T H)^{-1}]$ wherein S is a predetermined number of calibration patches, and each of the entries of the matrix H in the K dimension is selected from the matrix V in the G dimension based on each of the selected colors, the selected S number of colors comprising the colors of the calibration patches.

22. The image producing system of claim 21, wherein the characterization analysis system is further configured to:
prune the matrix V prior to forming the matrix H by searching for pairs of proportional columns in the matrix V such that $V_{ki}=\alpha V_{kj}$ for k=1, 2, . . ., K, and proportional factor $\alpha$ is less than 1, $V_{ki}$ denoting a first proportional column and $V_{kj}$ denoting a second proportional column; and removing the first proportional column of each of the proportional pairs of columns.

23. The image producing system of claim 21, wherein the characterization analysis system is further configured to:
select an initial set of S colors g(i), for i=1, 2, . . ., S comprising the matrix H;
compute a current value of $tr[(H^T H)^{-1}]$;
compute new values of $tr[(H^T H)^{-1}]$ by performing for i=1, 2, . . ., S the steps of:
computing a first new value of $tr[(H^T H)^{-1}]$ based on a first replacement of g(i) by g(i−1);
computing a second new value of $tr[(H^T H)^{-1}]$ based on a second replacement of g(i) by g(i+1);
terminating the computing new values if neither of the first new value or the second new value is less than the current value of $tr[(H^T H)^{-1}]$;
selecting a current replacement based on which of the first replacement and the second replacement computed a smaller new value of $tr[(H^T H)^{-1}]$; and
updating the current value of $tr[(H^T H)^{-1}]$ based on the selected replacement;
for each remaining unique set of S colors, select a new unique set of S colors comprising the matrix H; and
repeat the computing a current value and the computing new values for each selected new set of S colors.

24. The image producing system of claim 19, wherein the image producing system comprises a Xerographic system.

25. The method of claim 2, wherein:

the modeling the imaging producing system comprises modeling the imaging producing system with a plurality of basis functions for producing a predicted TRC, each basis function including a basis vector and a basis vector weight, the basis vector comprising at least one of a Singular Value Decomposition eigen vector, a Principal Component Analysis eigen vector, a Discrete Cosine Transform vector, a Fourier vector, and a Wavelet; and wherein the prediction error comprises a mean-square difference between actual image producing system output and a model predicted output, the prediction error including an estimation error and at least one of noise and low rank approximation.

* * * * *